UNITED STATES PATENT OFFICE.

ANDREAS JACOBI, OF LEVERKUSEN, NEAR COLOGNE, GERMANY, ASSIGNOR TO FARBENFABRIKEN VORM. FRIEDR. BAYER & CO., OF ELBERFELD, GERMANY, A CORPORATION OF GERMANY.

ANTHRACENE DYE.

1,038,589.  Specification of Letters Patent.  Patented Sept. 17, 1912.

No Drawing.  Application filed June 1, 1912.  Serial No. 700,985.

*To all whom it may concern:*

Be it known that I, ANDREAS JACOBI, doctor of philosophy, chemist, citizen of the German Empire, residing at Leverkusen, near Cologne, Germany, have invented new and useful Improvements in New Anthracene Dye, of which the following is a specification.

I have found that new and valuable violet to blue wool dyestuffs being chemically alpha-amino-anthraquinone compounds, containing aryloxy groups in beta position, can be obtained by reacting with phenols in the presence of alkaline agents upon derivatives of alpha-aminoanthraquinones, containing negative substitutents in beta position and which contain in para position to the amino group auxochromic groups, *i. e.* amino, alkylamino, arylamino or hydroxy groups, and by sulfonating, if necessary, the products thus obtained.

In order to illustrate the new process more fully the following examples are given, the parts being by weight:—

1. 50 parts of 1.4-diamino-2.3-dichloroanthraquinone are heated to boiling together with a solution of 75 parts of phenolate of sodium in 250 parts of phenol, until the blue-violet color of the melt has changed to a red-violet and parent material cannot be any more detected in the dyestuff isolated from a test portion. The melt is dissolved in a mixture of 150 parts of caustic soda (30 per cent.) and 750 parts of water, the dyestuff which separates is filtered off and washed with hot water. The compound thus obtained is the 1.4-diamino-2-phenoxy-3-chloro-anthraquinone, which after a recrystallization from chlorobenzene forms leaflets, soluble in pyridin with a violet and in concentrated sulfuric acid with a slightly yellow color. By gently heating the dry product with sulfuric acid (66° Bé.) a sulfonic acid is obtained which dyes wool from an acid bath in red-violet fast shades. The 1.4-diamino-2.3-diphenoxyanthraquinone obtained in an analogous manner yields by sulfonation a fast violet-red dye.

2. 50 parts of 1-amino-2-bromo-4-paratolylaminoanthraquinone are heated with 250 parts of phenol and 75 parts of phenolate of sodium to 190° C. for about 5 hours or until the product isolated from a test portion is free from halogen and dissolves in concentrated sulfuric acid with a red-violet color. The melt is worked up according to example 1 and the resulting 1-amino-2-phenoxy-4-paratolylaminoanthraquinone can be easily obtained in a pure state by recrystallization from pyridin. Its solution in chloroform is reddish-blue, redder than that of the parent material. The sulfonic acid obtained by heating it with sulfuric acid monohydrate dyes wool from an acid bath in fast violet shades.

3. 25 parts of the sodium salt of the 1-amino-2-bromo-4-paratolylaminoanthraquinone sulfonic acid are heated with a solution of 15 parts of potassium hydroxid in 100 parts of phenol to 185° C. until a sample isolated from a test portion dissolves in concentrated sulfuric acid with a red color (the parent material forms a blue solution with $H_2SO_4$). After cooling 300 parts of water and 140–150 parts of caustic soda (30 per cent.) are added. The dyestuff which separates in brilliant crystals, is filtered off and washed with a dilute solution of common salt. It dissolves in water with a reddish-blue color, from which wool is dyed in fast violet shades.

4. 50 parts of the sulfonic acid obtained from 1.5-diamino-2.6-dibromo-4.8-di-paratolylaminoanthraquinone are added to a mixture of 300 parts of phenol and 75 parts of phenolate of sodium and heated to boiling, until a sample isolated from a test portion dissolves in concentrated sulfuric acid with a dull blue color. The melt after having been treated as before described yields a dyestuff which dyes wool in greenish-blue shades.

5. 10 parts of the sodium salt of 1.5-diamino-4.8-dioxy-3-bromoanthraquinone-7-sulfonic acid are boiled for about 6 hours with 15 parts of phenolate of sodium and 80 parts of phenol, until the dyestuff isolated from a test portion is free from bromin. The new product isolated as above dyes wool in blue shades.

6. 25 parts of 1.5-diamino-4.8-dioxy-3.7-dibromoanthraquinone are boiled together with 35 parts of phenolate of sodium and 175 parts of phenol, until the dyestuff isolated from a test portion is free from bromin. By diluting the melt with alcohol (50 per cent.) the 1.5-diamino-4-8-diox-3.7-diphenoxyanthraquinone separates in leaflets. The product is insoluble in alcohol and difficultly soluble in nitrobenzene with a blue color. The colorless solution in concentrated sulfuric acid turns blue on addition of boric acid. By heating the new dyestuff with monohydrated sulfuric acid to from 80–90° C. it is transformed into a sulfonic acid, with which wool can be dyed in blue shades.

I claim:—

1. The new dyestuffs of the anthracene series, which are chemically sulfonic acids of alpha-amino-anthraquinone compounds containing aryloxy groups in beta position and containing in the para position to the amino-group and auxochromic group, which dyes are dark powders soluble in water and dyeing wool from violet to blue shades, substantially as described.

2. The new dyestuffs of the anthracene series, which are chemically sulfonic acids of alpha-amino-anthraquinone compounds containing phenoxy groups in beta position and containing in the para position to the amino-group an auxochromic group, which dyes are dark powders soluble in water and dyeing wool from violet to blue shades, substantially as described.

3. The new dyestuffs of the anthracene series, which are chemically sulfonic acids of alpha-amino-anthraquinone compounds containing aryloxy groups in beta position and containing an amino group in the para position to the amino group, which dyes are dark powders soluble in water and dyeing wool from violet to blue shades, substantially as described.

4. The new dyestuffs of the anthracene series, which are chemically sulfonic acids of alpha-amino-anthraquinone compounds containing aryloxy groups in beta position and containing a substituted amino group in the para position to the amino group, which dyes are dark powders soluble in water and dyeing wool from violet to blue shades, substantially as described.

5. The new dyestuffs of the anthracene series, which are chemically sulfonic acids of alpha-amino-anthraquinone compounds containing phenoxy groups in beta position and containing amino group in the para position to the amino group, which dyes are dark powders soluble in water and dyeing wool from violet to blue shades, substantially as described.

6. The new dyestuffs of the anthracene series, which are chemically sulfonic acids of alpha-amino-anthraquinone compounds containing phenoxy groups in beta position and containing a substituted amino group in the para position to the amino group, which dyes are dark powders soluble in water and dyeing wool from violet to blue shades, substantially as described.

In testimony whereof I have hereunto set my hand in the presence of two subscribing witnesses.

ANDREAS JACOBI. [L. S.]

Witnesses:
    HELEN NUFER,
    ALBERT NUFER.